Figure 1:
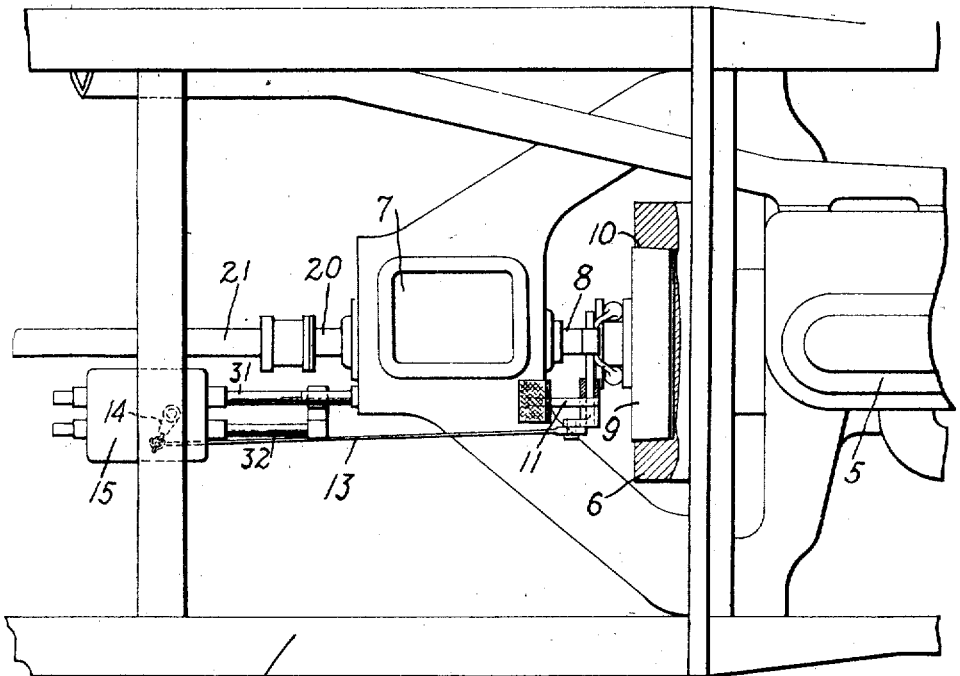

A. K. KUSEBAUCH.
GEAR SHIFTING MECHANISM.
APPLICATION FILED DEC. 4, 1914.

1,283,219.

Patented Oct. 29, 1918.
3 SHEETS—SHEET 2.

WITNESSES:
R. J. Ridge.
J. R. Langley.

INVENTOR
Anton K. Kusebauch
BY
Wesley G. Carr
ATTORNEY

A. K. KUSEBAUCH.
GEAR SHIFTING MECHANISM.
APPLICATION FILED DEC. 4, 1914.

1,283,219.

Patented Oct. 29, 1918.
3 SHEETS—SHEET 3.

WITNESSES:

INVENTOR
Anton K. Kusebauch
BY
ATTORNEY

UNITED STATES PATENT OFFICE.

ANTON K. KUSEBAUCH, OF PITTSBURGH, PENNSYLVANIA, ASSIGNOR TO WESTINGHOUSE ELECTRIC AND MANUFACTURING COMPANY, A CORPORATION OF PENNSYLVANIA.

GEAR-SHIFTING MECHANISM.

1,283,219.　　Specification of Letters Patent.　　Patented Oct. 29, 1918.

Application filed December 4, 1914.　Serial No. 875,440.

*To all whom it may concern:*

Be it known that I, ANTON K. KUSEBAUCH, a citizen of the United States, and a resident of Pittsburgh, in the county of Allegheny and State of Pennsylvania, have invented a new and useful Improvement in Gear-Shifting Mechanism, of which the following is a specification.

My invention relates to gear-shifting mechanisms and particularly to such mechanisms as are controlled by selective devices and are actuated by the usual clutch pedal to control the shiftable gear wheels of the transmission mechanisms of automobiles or other motor vehicles.

My invention has for one of its objects to provide a mechanism of the character indicated above that is simple in construction and efficient in operation to automatically return the shifted gear wheels to a neutral position before they can be adjusted for a different speed ratio.

A second object of my invention is to provide an arrangement whereby power that is stored during the forward stroke of the clutch pedal lever is utilized to effect the adjustment of the transmission mechanism for the selected speed ratio during the return stroke of the pedal lever.

In the operation of devices of the same general character as that of my invention, it is highly desirable that a means be provided for positively preventing the shifting of any of the transmission gear wheels for a different speed ratio until the gear wheel that has been previously shifted has been returned to a neutral position. It is desirable, also, that the return of the shifted gear wheels to a neutral position and the shifting of a second gear wheel for a new speed ratio should occur on separate strokes of the clutch pedal in order that a time interval of any desired length may elapse between such operations. A time interval is essential in order that the speeds of the gear wheels to be meshed may be made sufficiently nearly equal to avoid clashing of the respective teeth when they are brought into engagement.

According to the present invention, the clutch pedal lever may perform its normal functions without in any way affecting the transmission mechanism. The selective mechanism may be set or adjusted at any time in advance of the actual change in speed ratio. Upon actuation of the clutch-pedal lever beyond its clutch-disengaging position, the gear wheel that has been shifted is automatically and positively returned to its neutral position, and power is simultaneously stored in a suitable spring. After any desired interval, the pedal lever is released and the spring effects the adjustment of the transmission mechanism for the selected speed ratio.

Figure 2:
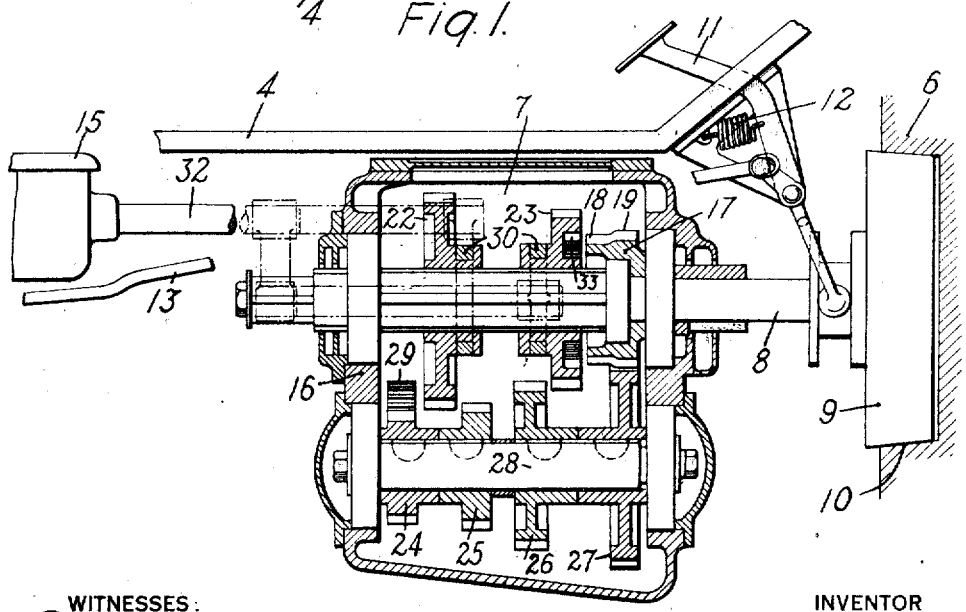
Figure 3:
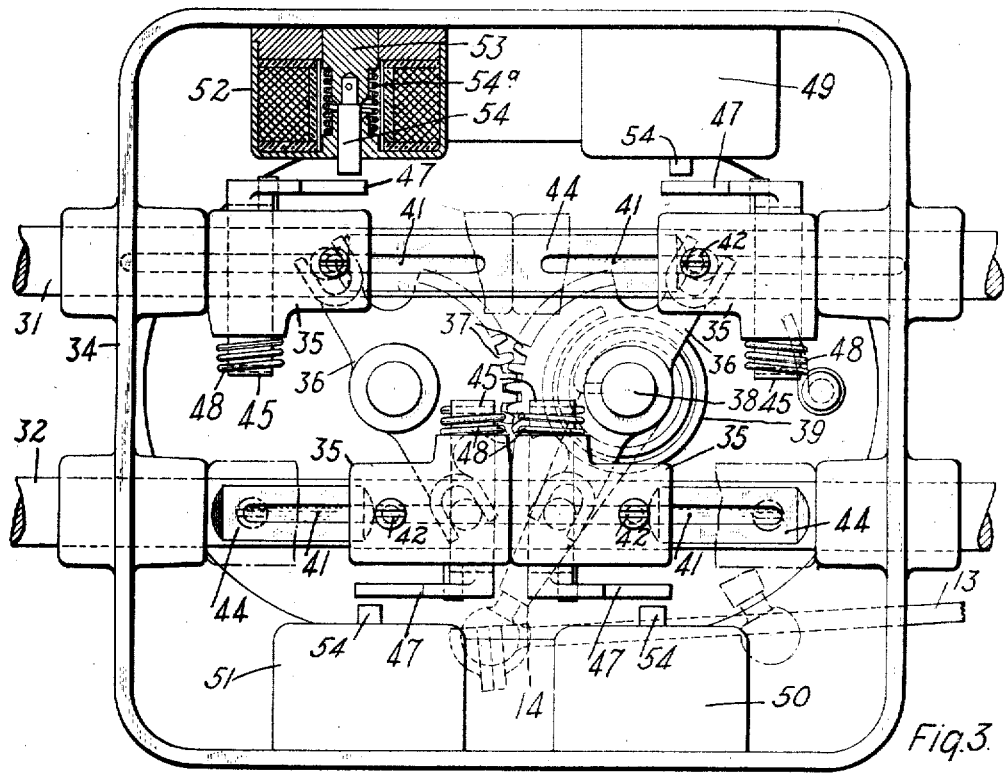
Figure 4:
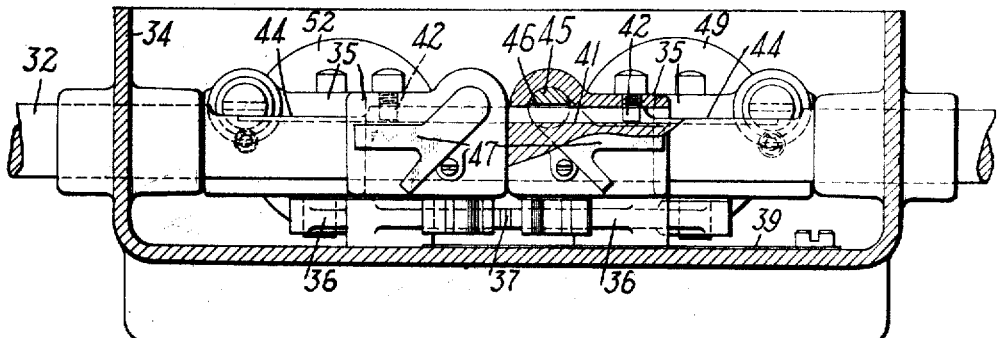
Figure 5:
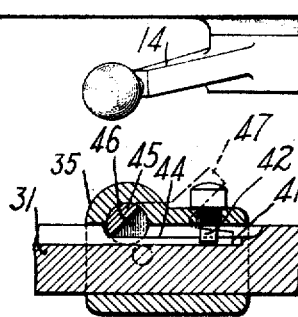
Figure 6:
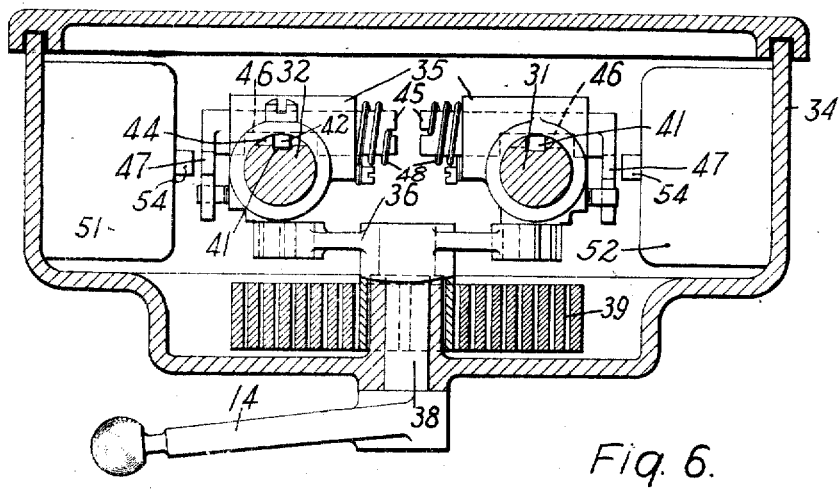
Figure 7:
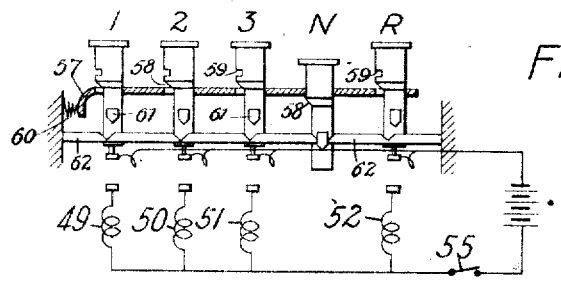

In the accompanying drawings, Figure 1 is a view, partially in plan and partially in section, of a portion of an automobile with my invention attached thereto. Fig. 2 is a view, partially in elevation and partially in section, of the transmission mechanism of an automobile and its related parts. Fig. 3 is a plan view of the gear-shifting mechanism. Fig. 4 is a view, partially in elevation and partially in longitudinal section, of the mechanism of Fig. 3. Fig. 5 is a view of certain details. Fig. 6 is a view, in transverse section, of the mechanism of Fig. 3. Fig. 7 is a diagrammatic view of circuits and apparatus employed in connection with my invention.

Referring particularly to Figs. 1 and 2, an automobile chassis 4, only a portion of which is shown, is provided with a gas engine 5 having a fly wheel 6. A transmission mechanism 7, or change-speed gear mechanism, is connected to the engine 5 by a shaft 8 and a conical clutch member 9 that is slidably mounted on the shaft 8 to coact with a correspondingly shaped clutch member 10 formed in the fly wheel 6. The clutch member 9 is controlled by the usual clutch-pedal lever 11. A spring 12 normally retains the clutch lever 11 in its rearward position with the clutch member 9 engaging the clutch member 10. The lever 11 has a lost-motion connection to a link 13 which connects it to a lever arm 14 of a gear-shifting mechanism indicated at 15.

The transmission mechanism 7 forms no part of my present invention but is so combined therewith that a description of it is desirable in order to explain the operation of the gear-shifting mechanism. The shaft 8, which is connected to the clutch member 9, extends into the transmission casing 16. A gear wheel 17, having two sets of gear teeth 18 and 19, is mounted upon the shaft within the casing 16. A transmission shaft 20, which is connected to the main transmission shaft 21, is in axial alinement with the shaft 8.

The shaft 20 is adapted to be connected to the shaft 8 at different speed ratios by means of two gear wheels 22 and 23 that are slidably keyed on the shaft 20, gear wheels 24, 25, 26 and 27 that are fixed upon a counter shaft 28 and an idler gear wheel 29 that is always in mesh with the gear wheel 24. The gear wheel 27 is always in mesh with the gear wheel 17 to connect the shafts 8 and 28. The mechanism is arranged to provide three speeds in the forward and one in the reverse direction. The changes in speed ratio are controlled by the slidable gear wheels 22 and 23 which are actuated by yoke members 30. The yoke members 30 respectively connect the gear wheels 22 and 23 to the shift rods 31 and 32 of the gear-shifting mechanism.

When the gear wheel 22 is in mesh with the gear wheel 25, the mechanism is in its first or low-speed position, and the shaft 8 is connected through the gear teeth 19, gear wheel 27, counter shaft 28, and gear wheels 25 and 22 to the transmission shaft 20. For the second or intermediate speed, the gear wheel 23 is shifted into mesh with the gear wheel 26. For the third or high speed, the gear wheel 23 is shifted to the right until internal gear teeth 33, with which the gear wheel 23 is provided, mesh with the gear wheel 17. The shaft 5 is then directly connected to the transmission shaft 20, and the latter is driven at engine speed. For driving in the reverse direction, the gear wheel 22 is shifted into mesh with the idler gear wheel 29. The transmission mechanism is illustrated in its neutral or inoperative position in which the shaft 20 is not connected to the counter shaft 28.

Referring now to Figs. 3, 4, 5 and 6, the gear-shifting mechanism 15 comprises a housing or casing 34 of substantially rectangular shape. The shift rods 31 and 32 are slidably mounted in the end walls of the casing. Four block members 35, a pair of which are slidably mounted on each of the shift rods 31 and 32, are connected for simultaneous actuation relatively to the shift rods. Each of the blocks 35 is connected to the corresponding block upon the other shift rod by means of a pivotally mounted lever 36 which is provided with gear teeth to form a segmental gear wheel 37.

The two levers, which thus connect the blocks in pairs, are operatively connected through the segmental gear wheels 37. One of the levers 36 is mounted upon a shaft 38 which is connected to the pedal lever 11 by means of the arm 14 and the link 13. A coil spring 39, which surrounds the shaft 38, is connected at one end, to the lever 36 and, at the other end, to the casing 34. An actuation of the pedal lever 11 beyond its clutch-disengaging position operates through the arm 14 and the segmental gear mechanism just described to actuate the block members 35 in opposite directions simultaneously.

Each of the shift rods 31 and 32 is provided with a pair of longitudinal grooves 41 into each of which extends a pin 42 that is carried by each of the block members 35. Each of the shift rods 31 and 32 is provided, also, with a pair of recesses 44 upon its upper surface which are smaller in extent, both longitudinally and in depth, than the groove 41. Each of the block members 35 carries also a short rock shaft 45. Each of the rock shafts 45 is cut away at an intermediate portion to form a recess 46, which, under certain conditions, permits free relative movement between the rock shaft 45 and the shift rods 31 and 32. Each of the rock shafts 45 has a lever arm 47 integral with it. Normally, springs 48 retain the rock shafts 45 in the position illustrated, with the recesses 46 in such a position that the shafts 45 are without the path of movement of the corresponding shift rods 31 and 32.

Four electromagnets 49, 50, 51 and 52 are respectively mounted upon the side walls of the casing 34. Each electromagnet comprises a movable core member 53 that is secured to a stop member 54 which projects from the magnet structure. The core members 53 are retained in their illustrated positions by springs 54ᵃ. When the windings of the several electromagnets are energized, the stop members 54 project into the paths of movement of the arms 47.

The electrical circuits for controlling the gear-shifting mechanism are illustrated in Fig. 7. The electrical connections comprise four parallel circuits each of which is controlled by push buttons that are respectively designated according to the speed ratio which they control, by 1, 2, 3, N (neutral) and R (reverse). The several push buttons are so interlocked that only one button can close its corresponding circuit at one time and this one remains closed until it is released by the actuation of another button. The neutral button, however, is arranged to open as soon as released, after actuation. The coils in the several electromagnets 49, 50, 51 and 52 are respectively in series with the push buttons for first, second and third speeds and for reverse operation. The neutral button operates simply to release any other button that has been previously actuated. Each of the push buttons projects through a slot or opening in a latch member 57 and is provided with an inclined surface 58 for engaging the latch member. Each of the push buttons, except the neutral button, is provided also with a notch 59 to be engaged by the latch member 57 when one of the push buttons has been fully depressed. A spring 60 tends to maintain the latch member in engagement with the notch of the push button in operative position. Each of the push buttons is further provided with a wedge-shaped projection 61 which coacts with a plurality of bars 62 to prevent more than one switch from occupying an operative position at one time. The total length of the bars 62 is such that two projections 61 cannot be inserted simultaneously between a corresponding pair of bars. It will be readily understood that the actuation of one of the push buttons will operate to disengage the latch member 57 and thus release any button that had been previously depressed.

It may be assumed that the transmission gear mechanism is in its neutral position, as illustrated in Fig. 2, and that the gear-shifting mechanism is in its corresponding normal or neutral position. In the normal position of the gear-shifting mechanism, the several block members 35 occupy the positions indicated by full lines, Fig. 3. It may be assumed, also that the engine has been started and that the engine clutch members 9 and 10 are disengaged.

As it is desirable to start the vehicle on first speed, the push button 1 is pressed to close a circuit extending from the battery through the push button 1, coil of electromagnet 49, and limit switch 55 back to the battery. The stop member 54 is accordingly actuated outwardly but is prevented from traversing its entire path of movement because it engages the horizontal portion of the arm 47.

The clutch pedal lever 11 is then pressed forwardly to actuate the rod 13, to which it has a lost-motion connection. The lever arm 14 accordingly actuates the lever 36 to which it is directly connected and the other lever 36 to which it is connected by means of the segmental gear wheels 37 simultaneously in opposite directions. The blocks 35 on the rods 31 and 32 are respectively actuated inwardly and outwardly from their normal positions. During this movement, the pins 42 reciprocate in the grooves 41, and the stop member 54 of the electromagnet 49 slides along the horizontal portion of the arm 47.

When the pedal lever has reached the extremity of its forward movement, the block members 35 and their connected parts are in their respective positions indicated by dotted lines (Fig. 3). The arm 47 has now passed beyond the stop member 54 of the electromagnet 49 and the stop member is actuated outwardly into the path of movement of the arm 47. The forward movement of the clutch lever operates through the shaft 38 and the corresponding lever 36 to place the spring 39 under tension.

After the elapse of any desired interval, the operator releases the clutch pedal, and the spring 39 operates through the lever 36 to return the block members 35 to their respective normal positions. The stop member 54 of the electromagnet 49 almost immediately engages the corresponding arm 47 to oscillate the rock shaft 45 and cause it to assume such a position that the end of the recessed portion 44 is engaged by it as the corresponding block member 35 is moved inwardly. The relative positions of the several parts when one of the rods is engaged for shifting are clearly shown in Fig. 5. The shift rod 31 is accordingly moved to the right, as shown, and the gear wheel 22 of the transmission mechanism is shifted into mesh with the gear wheel 25. When the gear wheels 22 and 25 are fully meshed, the limit switch 55 may be opened by any suitable means to break the circuit established by the push button 1. The further return movement of the pedal lever 11, which is permitted by the lost-motion connection, operates to effect the engagement of the clutch members 9 and 10, and the vehicle will accordingly be driven at first speed.

When it is desired to change the speed ratio, as, for example, to second speed, the push button 2 may be pressed at any desired time in advance of the actual change. The coil of the electromagnet 50, which is controlled by it, will not be immediately energized because the limit switch 55 is in its open position. The operator then presses the pedal lever 11 to disengage the engine clutch. The rod 31, which is in its shifted position, is immediately engaged by the pin 42 upon an inward movement of the corresponding block member 35. The further actuation of the pedal lever 11, after the clutch is disengaged, accordingly operates to shift the rod 31 to its neutral position.

As above described, in connection with establishing the first speed, the spring 39 is placed under tension by the forward movement of the clutch pedal. The limit switch 55 closes upon a slight movement of the shift rod 31 to return to its neutral position, and the coil of the electromagnet 50 is energized to project the stop member 54 outwardly into engagement with the corresponding arm 47. At the extremity of the forward movement of the clutch-pedal lever, the various parts again assume their respective dotted line positions.

The operator then releases the pedal lever 11, and the spring 39 operates, as above described, to shift the rod 32 to the left as shown, and thereby mesh the gear wheel 23 with the gear wheel 26. The clutch members are then engaged as described above in connection with first speed. In the same manner, changes may be made to third speed, or the direction of drive reversed, by actuating the appropriate push buttons. It will, of course, be understood that, in order to reverse the direction of the vehicle, it is necessary to bring it to a stop before the driving connections are established.

When it is desired to bring the transmission mechanism to an inoperative or neutral position, the push button N is pressed to release such other button as may have been previously pressed. The clutch pedal is actuated as before to release the engine clutch members, and the corresponding pin 42 restores the shift rod 31 or 32, as the case may be, to its initial position. The return movement of the clutch pedal does not in any way affect the position of the shift rods or the gear wheels to which they are connected because neither of the electromagnets is energized to produce a change in the position of the several rock shafts 45.

The advantages of my invention are that a positive means is provided for returning the shift rods to their neutral positions whenever the clutch pedal is actuated beyond its clutch-disengaging position, and this action occurs regardless of the actuation of either of the push buttons. The shift rods are returned to their neutral positions and are arranged for a different speed ratio by separate strokes of the clutch pedal, thereby allowing a sufficient time interval for the gears to be meshed to have substantially equal speeds. Another important advantage consists in meshing the gear wheels by resilient means, thereby insuring that, if meshing does not occur immediately upon their engagement, such action will take place immediately upon the gear wheels assuming the correct relative positions.

I claim as my invention:

1. In a gear shifting mechanism, the combination with a pair of shift rods, and two pairs of relatively movable members for coacting with the respective rods, of means for simultaneously actuating said pairs of members respectively toward and away from central positions, and means on said members for engaging said rods.

2. In a gear shifting mechanism, the combination with a pair of shift rods, and two pairs of relatively movable members for coacting respectively with said rods, of means for simultaneously actuating said pairs of members respectively toward and away from central positions, and selectively controlled means on said members for engaging said rods.

3. In a gear shifting mechanism, the combination with a pair of shift rods, and two pairs of members movable longitudinally of said rods for coacting respectively with said rods, of a clutch lever, and means whereby movement of said clutch lever in one direction causes the members of each pair to move simultaneously in opposite directions.

4. In a gear shifting mechanism, the combination with a pair of shift rods, and two pairs of movable members for coacting respectively with said rods, of a clutch lever, and means whereby movement of said clutch lever in one direction causes said pairs of members to move respectively toward and away from central positions.

5. In a gear shifting mechanism, the combination with a pair of shift rods and a pair of members movable relatively thereto, of means carried by one of said members for shifting one of said rods in one direction from a neutral position when said member moves in one direction and means connected to the other of said members for shifting the other rod in the same direction from a neutral position when the second member is moved in the opposite direction.

6. In a gear-shifting mechanism, the combination with a pair of shift rods, and a pair of members simultaneously movable relatively thereto in opposite directions, of means carried by one of said members for shifting one of said rods in one direction from a neutral position, and means connected to the other of said members for shifting the other rod in the same direction.

7. In a gear-shifting mechanism, the combination with a pair of shift rods, and two pairs of relatively movable members for coacting with the respective rods, of means for operatively connecting each of one pair of members with a corresponding member on the other rod for simultaneous movement in opposite directions.

8. In a gear-shifting mechanism, the combination with a pair of shift rods, and two pairs of relatively movable members for coacting with the respective rods, of means for operatively connecting each of one pair of members with a corresponding member on the other rod for simultaneous movement in opposite directions, said means comprising a pair of pivotally mounted members.

9. In a gear-shifting mechanism, the combination with a pair of shift rods, and a pair of relatively movable members for coacting with each of said rods, of means for operatively connecting each of one pair of members with a corresponding member on the other rod for simultaneous movement in opposite directions, said means comprising a pair of pivotally mounted members and gear mechanism for connecting said pivotally mounted members.

In testimony whereof, I have hereunto subscribed my name this 27th day of Nov. 1914.

ANTON K. KUSEBAUCH.

Witnesses:
 B. B. HINES,
 M. C. MERZ.